Figure 1:
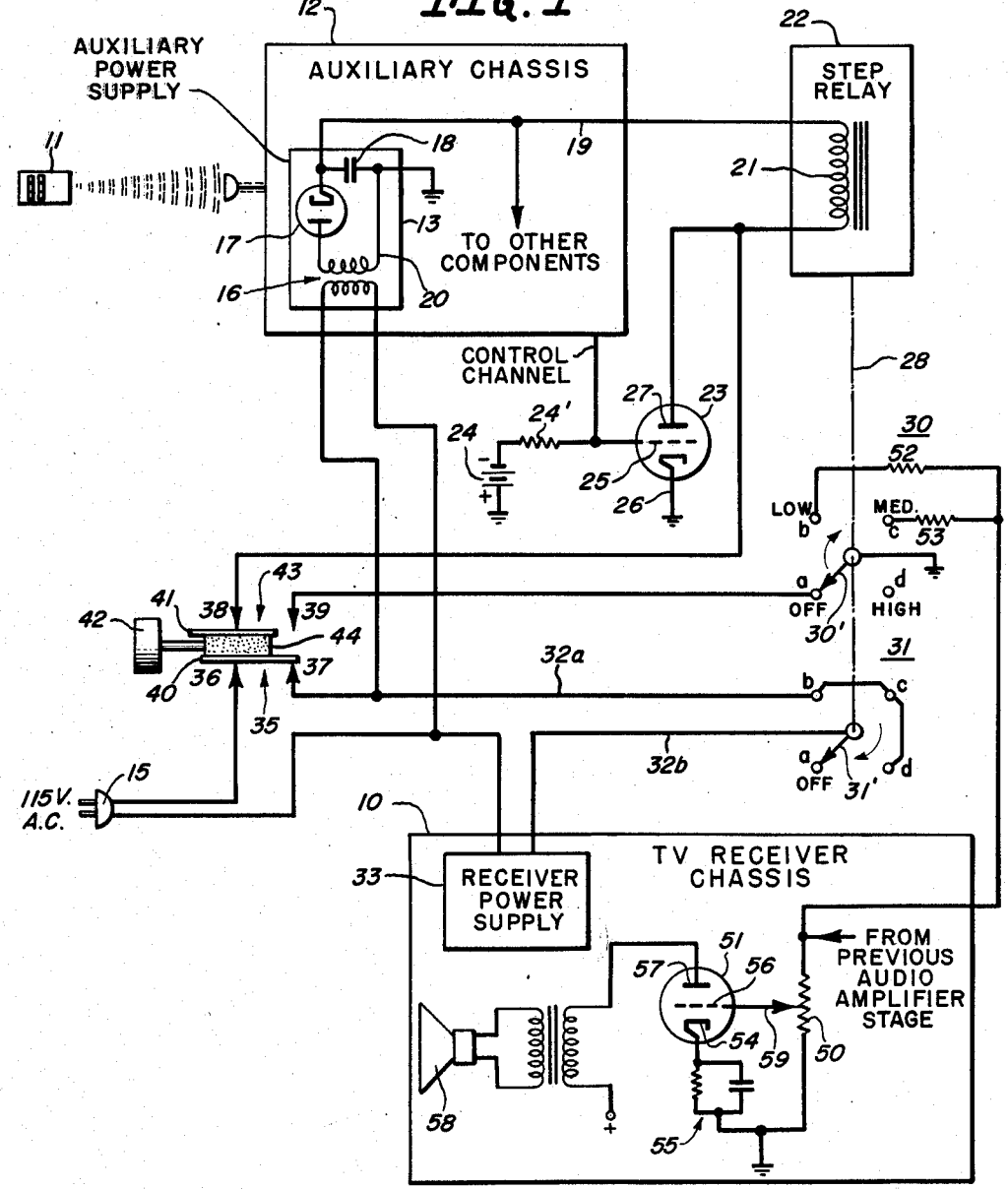

April 7, 1964 — N. KAFKA — 3,128,444
REMOTE CONTROL SYSTEM
Filed Nov. 9, 1960

INVENTOR.
Nicholas Kafka
BY John J. Pederson
Atty.

United States Patent Office 3,128,444
Patented Apr. 7, 1964

3,128,444
REMOTE CONTROL SYSTEM
Nicholas Kafka, Lombard, Ill., assignor to Zenith Radio Corporation, a corporation of Delaware
Filed Nov. 9, 1960, Ser. No. 68,214
5 Claims. (Cl. 340—15)

This invention is directed to remote control systems and more specifically to such systems for use with television receivers and the like.

Remote control systems employed with television receivers and the like commonly comprise a control unit which detects command signals radiated by a remote control transmitter actuated by the user and selectively develops corresponding control signals which are used to control selected operating characteristics of the controlled device. For example, when the controlled device is a television receiver, tuning and audio volume level may be controlled and also the receiver may be turned "on" and "off" by the control unit.

In order to hold the controlled device ready for remote actuation at will by the user, the control unit must be continuously maintained in an energized state. Thus, the control system is usually constructed so that the controlled device may be de-energized by the control unit while the control unit itself remains energized and ready to receive any future command signal. When the controlled device is not to be used for an extended period of time, such as overnight, it may be desirable to turn off the standby power to the control unit. When it is subsequently desired to condition the controlled device for remote control operation, it is of course necessary to re-establish the standby power to the control unit.

If the control unit is of the electronic type employing thermionic vacuum tubes, as is frequently the case there is a waiting period following application of standby power, corresponding to the warm-up time of the vacuum tubes in the control unit, before the controlled device will respond to remote command signals. In many instances, the television receiver or other controlled device may have been turned off by remote control prior to disruption of the standby power, and in this event its warm-up-time cannot be initiated until that of the control unit has been completed. In many instances, then, a double warm-up period is required before normal operation of the controlled device is restored following shutdown intervals.

It is a primary object of this invention to provide a new and improved remote control system.

It is another object of this invention to provide a remote control system which may be completely energized by the user in one operation.

It is a more specific object of this invention to provide a remote control system which privides for remote "on-off" control while avoiding double warm-up periods following shutdown intervals.

Accordingly, apparatus embodying the invention comprises an electrical utilization device having a predetermined controllable operating characteristic. Means including an on-off switch are provided for establishing an operative connection between the utilization device and a main electrical power source. A control unit responsive to received command signals controls the operating characteristics of the electrical utilization device. Power-supply-control means including the control unit and also responsive to received command signals are provided for alternately opening and closing the operative connection between the main power source and the utilization device. Finally, means are provided which are responsive to actuation of the on-off switch to its "off" condition for conditioning the power-supply-control means to re-establish the operative connection upon subsequent actuation of the on-off switch to its "on" condition.

Figure 2:
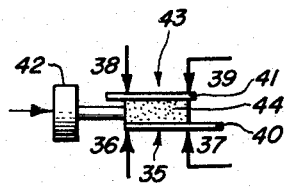
Figure 3:
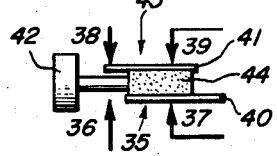

The features of the present invention which are believed to be novel are set forth with particularity in the appended claims. The invention, together with further objects and advantages thereof, may best be understood by reference to the following description taken in connection with the accompanying drawing, in the several figures of which like reference numerals identify like elements, and in which:

FIGURE 1 is a schematic diagram of a television receiver embodying a remote control system in accordance with the invention; and FIGURES 2 and 3 are fragmentary views of a switch included in the apparatus of FIGURE 1, illustrating the switch in different operating positions.

In FIGURE 1, a conventional television receiver chassis 10 is shown as an example of a type of electrical utilization device to which the present invention is particularly, though not exclusively, applicable. The construction and operation of the television receiver chassis 10 is entirely conventional except for its volume and "on-off" controls which will be discussed in detail below.

A remote control system which controls the audio volume level and energizes and de-energizes television receiver chassis 10 includes a transmitter 11 and an auxiliary chassis 12. Transmitter 11 is portable and may be of the type which selectively develops a plurality of ultrasonic acoustic command signals of different frequencies. For example, transmitter 11 may be of a type including longitudinal-mode vibrators such as aluminum rods, with mechanically actuated strikers operatively associated with each rod. When the user of transmitter 11 operates a selected striker, a rod is struck on its end and generates an ultrasonic command signal of a frequency determined by the physical length of the rod. By using rods of different lengths command signals of distinctively different frequencies may be selectively generated.

Auxiliary chassis 12 includes a plurality of control channels and a frequency selective amplifier which detects the remotely generated command signals radiated by transmitter 11 and in response to each received command signal develops a control pulse on the specific control channel which is associated with the frequency of the received command signal. Only one control channel is shown in FIGURE 1 but more may be utilized to control additional operating characteristics of television receiver chassis 10 such as tuning the television receiver.

Included in auxiliary chassis 12 is an auxiliary power supply 13 comprising a power transformer 16 with a half-wave rectifier 17 in series between the secondary winding of transformer 16 and an output lead 19, a secondary lead 20 which is grounded, and a filter capacitor 18 connected between the two leads. Transformer 16 steps up the A.C. voltage from plug 15 which is then rectified by rectifier 17. Filter capacitor 18 acts as a storage device which serves to maintain the D.C. output voltage constant while half-wave rectifier 17 is blocking the passage of alternate half-cycles of the A.C. voltage wave. Thus, a D.C. potential, commonly called B+, is developed on lead 19. B+ lead 19 is connected to other components of auxiliary chassis 12 (not shown) and to one terminal of the actuating element or solenoid 21 of a step relay 22. As thus far described, the remote control system may correspond to that described in U.S. Patent No. 2,817,025 granted to Robert Adler on December 17, 1957, and assigned to the same assignee as the present application.

Included in the single control channel of auxiliary chassis 12 is a control tube 23 comprising a control grid 25 which is connected through a grid resistor 24' to the negative terminal of a suitable bias voltage source, here schematically indicated as a battery 24 the positive terminal of which is grounded. Tube 23 also comprises a cathode 26 which is grounded, and a plate or anode 27 which is connected to the other terminal of actuating element 21.

Step relay 22 is coupled mechanically by a linkage 28 to a switch arm 30' of a switch 30 and a switch arm 31' of a switch 31. Switch 30 includes four fixed terminals 30a–30d arranged for selective engagement by switch arm 30' which is grounded. Fixed terminals 30b and 30c are coupled to a grounded grid resistance 50 of an audio amplifier 51 of television receiver chassis 10 through small and large resistances 52 and 53 respectively. Fixed terminal 30d is unconnected or floating. Audio amplifier tube 51 includes a cathode 54 which is grounded through an RC cathode biasing network 55, a control grid 56, and a plate or anode 57. Plate 57 is coupled to a loudspeaker 58. Control grid 56 is connected to grid resistance 50 through a slidable contact or voltage tap 59 which is utilized as a manual volume control. With switch arm 30' contacting terminals 30b, c or d, the volume is at a low, medium or high level, respectively, as designated by the legends in the drawing.

Means including control unit or auxiliary chassis 12 and also responsive to received command signals are provided for alternately opening and closing the operative connection between a main power source or power plug 15 and receiver power supply 33. Switch 31 comprises terminals 31a–31d which are of corresponding orientation to like lettered terminals of switch 30. Terminals 31b–31d are shorted or tied together and terminal 31a is unconnected or floating. Switch 31 is connected in series with the energizing circuit 32a, 32b from plug 15 to a receiver power supply 33 of television receiver chassis 10. With switch arm 31' in contact with terminal 31a, the operative connection or energizing circuit to receiver power supply 33 is open; with switch arm 31' in contact with any one of terminals 31b, 31c, and 31d, the operative connection to receiver power supply 33 is closed.

Also in series with energizing circuit 32a, 32b is a manually operable slide switch 35 comprising a terminal 36 which is connected to plug 15, a terminal 37 which is connected to terminals 31b, 31c and 31d, and a sliding contact or switch arm 40 which selectively engages terminals 36 and 37, or terminal 37 alone, in a manner to be explained. Switch 35 is also in series with the energizing circuit to transformer 16 of auxiliary power supply 13. With switch arm 40 contacting terminals 36 and 37, auxiliary chassis 12 is energized and switch 35 is "on"; with switch arm 40 out of contact with terminal 36, chassis 12 is de-energized and switch 35 is "off."

Further in accordance with the invention, means are provided which are responsive to actuation of on-off switch 35 to its "off" condition for conditioning the above mentioned means (for alternately opening and closing the operative connection between power plug 15 and receiver power supply 33) to re-establish the operative connection upon subsequent actuation of on-off switch 35 to its "on" condition. In the illustrated embodiment, a sliding contact or switch arm 41 of a switch 43 is connected to switch arm 40 by a linkage 44 of insulating material. Switch 43 includes terminals 38 and 39 which are adapted for engagement by switch arm 41. Terminal 38 is connected to plate 27 of control tube 23 and terminal 39 is connected to terminal 30a. An operating knob 42 is connected to linkage 44 and is accessible to the operator of the television receiver.

In FIGURE 1, switches 35 and 43 are shown in the "on" position, where knob 42 is pulled to its extreme left with switch arm 40 engaging terminals 36 and 37 and switch arm 41 is dis-engaged from contact with terminal 39. As knob 42 is pushed in the opposite direction or toward the right, as shown in FIGURE 2, both pairs of terminals are engaged by their respective switch arms; the position shown in FIGURE 2 is maintained only momentarily as the user pushes the knob 42 from the position shown in FIGURE 1 to the extreme right or "off" position as shown in FIGURE 3 where switch arm 40 is dis-engaged from contact with terminal 36 and switch arm 41 connects terminals 38 and 39 together. In the "on" operating position shown in FIGURE 1, switch 35 is closed and switch 43 is open, while the reverse condition is obtained in the "off" position illustrated in FIGURE 3.

In explaining the operation of the invention, it may be assumed that switch 35 is initially in its closed or "on" position as shown in FIGURE 1 with terminals 36 and 37 shorted together by switch arm 40 to complete the energizing circuit which supplies standby power to auxiliary power supply 13. However since switch arm 31' of switch 31 is in contact with terminal 31a, switch 31 is open and the power supply 33 for television receiver chassis 10 is de-energized. In order to energize television receiver chassis 10, the user must generate a command signal of the proper frequency from his transmitter 11 to produce a positive-polarity control pulse in the control channel; this pulse is applied to grid 25 and overcomes the negative bias of battery 24 which normally biases tube 23 beyond cut-off, thus allowing the tube to conduct. The B+ ground return circuit is thus completed through the plate current path of tube 23, thus energizing actuating element 21 of step relay 22 to rotate switch arms 30' and 31' to their respective terminals "b." With switch arm 31' in contact with terminal 31b the operative connection between television receiver power supply of receiver chassis 10 and plug 15 is completed through switches 35 and 31 and receiver power supply 33 is energized.

With switch arm 30' contacting terminal 30b the audio volume of television receiver chassis 10 is at a low level since a substantial portion of the audio input signal to grid 56 is shunted to ground through small resistance 52; if the user wishes to increase the volume level, he generates a command signal of the proper frequency to rotate switch arm 30' to the next volume level, in this case "medium." If the user wishes to discontinue his viewing but still hold the auxiliary chassis in readiness to receive future control signals, he successively generates two additional command signals which rotate switch arm 31' into contact with terminal 31a to open the operative connection between power plug 15 and receiver power supply 33 and de-energize television receiver chassis 10. Auxiliary chassis 12 remains energized since switch 25 is still "on."

If television receiver chassis 10 is to be de-energized for an extended period of time, the user may de-energize auxiliary chassis 12 by actuating switch 35 to its "off" position illustrated in FIGURE 3, thus opening power lead 32 from plug 15 to auxiliary power supply 13 and also opening the operative connection to receiver power supply 33 if not already opened by switch 31.

In accordance with the invention, actuation of switch 35 to its "off" position with switch arm 40 dis-engaged from terminal 36, conditions switch 31 to re-establish the operative connection between power plug 15 and receiver power supply 33 upon subsequent actuation of switch 35 to its "on" position. When switch 35 is actuated to its "off" position by the user pushing knob 42 to the right, sliding switch arm or contact 41 of switch 43 engages terminal 39 thus short-circuiting terminals 38 and 39 together before switch arm 40 dis-engages terminal 36 (FIGURE 2) to actuate step relay 22 by completing the B+ ground return circuit through switch arm 30'. Step relay 22 rotates switch arms 30 and 31 to the next position with switch arm 31' contacting terminal 31b which is an "on" position. When the switch arms 40 and 41 have completed their travel to the extreme right, as shown in FIGURE 3, switch arm 40 is dis-engaged from terminal 36 to de-energize both auxiliary power supply 13 and receiver power supply 33. When the user wishes to again use his television receiver, he pulls knob 42 to the left, energizing the tubes in the control unit represented by auxiliary chassis 12 and at the same time energizing television receiver chassis 33 through the closed switch 31. Thus, double warm-up has been eliminated.

Switches 35 and 43 are constructed so that switch arm 41 engages terminal 39 before switch arm 40 dis-engages from terminal 36 thus retaining a B+ potential in auxiliary power supply 13 a sufficient amount of time to actuate step relay 22. When step relay 22 rotates switch arm 30′ into contact with terminal 30b, the B+ ground return circuit energizing relay 22 is opened thereby preventing any further actuation of switch 30. Filter capacitor 18 of auxiliary power supply 13 may have an energy capacity that is sufficient to energize step relay 22 even after auxiliary power supply 13 is disconnected from plug 15; in this event, no overlap in the closed conditions of switches 35 and 36 is necessary.

Thus, the invention provides a new and improved remote control system which provides for remote on-off control while avoiding double warm-up periods following shutdown intervals. Moreover this is accomplished conveniently and economically, without requiring complex or special operation by the user.

While a particular embodiment of this invention has been shown and described, it will be obvious to those skilled in the art that changes and modifications may be made without departing from the invention in its broader aspects, and, therefore, the aim in the appended claims is to cover all such changes and modifications as fall within the true spirit and scope of the invention.

I claim:

1. In combination: an electrical utilization device having a predetermined controllable operating characteristic; means including an on-off switch for establishing an operative connection between said utilization device and a main electrical power source; a control unit responsive to received command signals for controlling said operating characteristic; power-supply-control means including said control unit and also responsive to received command signals for alternately opening and closing said operative connection between said main power source and said utilization device; and means responsive to actuation of said on-off switch to its "off" condition for conditioning said power-supply-control means to re-establish said operative connection upon subsequent actuation of said on-off switch to its "on" condition.

2. In combination: a wave-signal receiver having a predetermined controllable operating characteristic; means including an on-off switch for establishing an operative connection between said receiver and a main electrical power source; a control unit responsive to received command signals for controlling said operating characteristic; power-supply-control means including said control unit and also responsive to received command signals for alternately opening and closing said operative connection between said main power source and said receiver; and means responsive to actuation of said on-off switch to its "off" condition for conditioning said power-supply-control means to re-establish said operative connection upon subsequent actuation of said on-off switch to its "on" condition.

3. In combination: a remote-control television receiver having a volume control; means including an on-off switch for establishing an operative connection between said television receiver and a main electrical power source; a control unit responsive to received command signals for adjusting the volume control; power-supply-control means including said control unit and also responsive to received command signals for alternately opening and closing said operative connection between said main power source and said television receiver; and means responsive to actuation of said on-off switch to its "off" condition for conditioning said power-supply-control means to re-establish said operative connection upon subsequent actuation of said on-off switch to its "on" condition.

4. In combination: a remote-control television receiver having a volume control; means including an on-off switch and switch means coupled to said volume control for establishing an operative connection between said television receiver and a main electrical power source; a control unit responsive to received command signals for adjusting the volume control; means including said control unit and also responsive to received command signals for actuating said switch means to alternately open and close said operative connection between said main power source and said television receiver; and means responsive to actuation of said on-off switch to its "off" condition for conditioning said switch means to re-establish said operative connection upon subsequent actuation of said on-off switch to its "on" condition.

5. In combination: a remote-control television receiver having a cyclic volume control with a plurality of positions for adjusting audio volume level and an "off" position; relay means for adjusting said volume control; means including an on-off switch and switch means coupled to said volume control responsive to establishment of said volume control in any of said plurality of positions for establishing an operative connection between said television receiver and a main electrical power source and also responsive to establishment of said volume control in said "off" position to open said operative connection; a control unit responsive to received command signals for energizing said relay means to adjust said volume control; and additional energizing means for said relay means responsive to actuation of said on-off switch to its "off" condition to re-establish said volume control in one of said plurality of positions.

References Cited in the file of this patent

UNITED STATES PATENTS

| | | |
|---|---|---|
| 2,451,150 | Brian | Oct. 12, 1948 |
| 2,992,412 | Spindler | July 11, 1961 |